United States Patent [19]

Brooks

[11] Patent Number: 4,618,544
[45] Date of Patent: Oct. 21, 1986

[54] EXPLOSION PROOF BATTERY

[76] Inventor: Alan C. Brooks, 572 Darlington La., Apt. 24, Crystal Lake, Ill. 60014

[21] Appl. No.: 762,428

[22] Filed: Aug. 5, 1985

[51] Int. Cl.[4] .............................................. H01M 2/12
[52] U.S. Cl. ........................................ 429/53; 429/54; 429/56; 429/83; 429/88
[58] Field of Search ...................... 429/53–55, 429/83, 87, 88

[56] References Cited

U.S. PATENT DOCUMENTS

| | | | |
|---|---|---|---|
| 1,920,261 | 8/1933 | Lavender | 429/83 |
| 2,294,427 | 9/1942 | Spicer et al. | 429/54 |
| 2,480,861 | 9/1949 | Jaworski et al. | 429/83 |
| 2,516,084 | 7/1950 | Wells | 429/83 X |
| 4,078,121 | 3/1978 | Gratzmuller | 429/54 |
| 4,424,263 | 1/1984 | Howell et al. | 429/88 |

Primary Examiner—Brian E. Hearn
Assistant Examiner—Stephen J. Kalafut
Attorney, Agent, or Firm—Russell L. Johnson

[57] ABSTRACT

An improved explosion proof battery wherein the improvement comprises the separation of the gas flows in and out of each chamber from each other and the provision of check valves to each independent gas path to prevent the propagation of gas ignition from one cell to its neighbors when that ignition arises from within the battery. The battery and all of its elements are fabricated as a single substantially unitary structure.

4 Claims, 8 Drawing Figures

EXPLOSION PROOF BATTERY

BACKGROUND

This invention is an improvement of my previously invented explosion proof battery which is the subject of my U.S. Pat. No. 4,529,674 and which is incorporated herein by reference.

The means of that invention serves well to protect the battery from externally ignited gases propagating combustion to the battery cells and thereby causing a dangerous explosion. However, ongoing studies of the battery's performance reveals situations where significant improvement in the battery can be achieved with the addition of new inventive means to overcome the problems associated with these situations.

In large batteries having tens and even hundreds of cells it is possible to have internal ignition sources develop from a number of circumstances, such as faulty workmanship in assembling the battery, faulty materials of construction, damage in handling the battery, and the like. These large batteries, unlike the ordinary automobile battery can still be serviceable with one or a small number of "dead" cells. Heretofore, when ignition reaches or is originated in the interior of the battery the ignition has propagated from cell to cell by way of ignition routes between the cells and as a result not only did a large explosion occur, but many cells of the battery were damaged to the point where it became necessary to remove the battery from service and replace the damaged cells or discard the battery.

Another internally arising battery explosion potential comes about when the battery is tipped to a steep angle or inverted so that the normal gas exit routes are blocked by battery fluid. Such situations can arise in auto accidents, in vehicles that can operate at steep angles, in airplanes flying inverted, and the like. Ordinarily there is sufficient gas space in the cell and the pressure build up is negligible so that no significant hazard is present. However, if the gas escape paths are blocked for a lengthy period of time or there is a sustained heavy electrical load placed on the battery when the gas escape ports are blocked then a hazardous situation is present. First, the ordinary battery will expel battery fluids through the ordinary gas vents of the battery, and if the pressure buildup is great enough an explosion can occur.

OBJECTS

It is therefore an object of this invention to provide an explosion proof battery wherein the gas intake and gas exit paths from each battery cell are separate paths.

It is further an object of this invention to provide the battery described above wherein the paths to and from the cells are provided with check valves so the fluids, gases and/or liquids, may flow in only one direction in the system.

It is further an object of this invention to provide the battery described above wherein a liquid input and removal means and a liquid level sight rod are provided for each cell.

It is further an object of this invention to provide the battery as described above wherein the improvements are incorporated in a header and liquid ignition barrier chamber which are incorporated into a substantially unitary construction.

Other objects will become apparent from the following specifications, drawings, and claims.

BRIEF DESCRIPTION OF THE PRIOR ART

The inventor's own patent cited above is the closest prior art known to the inventor. The prior art known to the inventor deals with means for preventing ignition of gases from propagating from the outside of the battery to the cells. The inventor knows of no prior art that is directed at preventing both propagation of ignition from the outside of the battery to the cells and to prevent propagation of ignition between cells should the original ignition source be an internal ignition source.

DETAILED DESCRIPTION OF THE INVENTION

Figure 1:
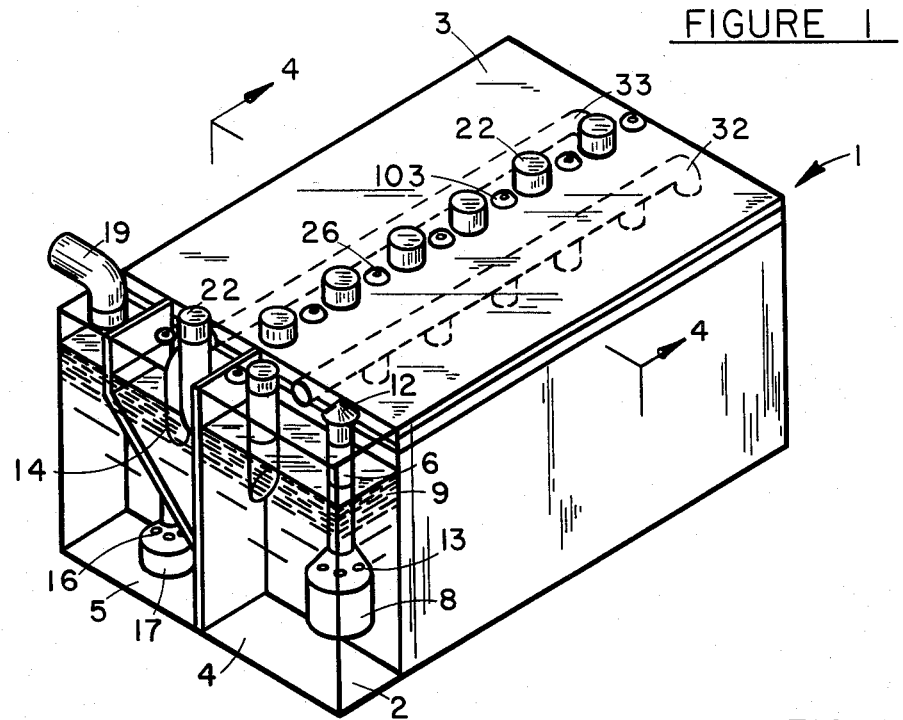
FIG. 1 is a schematic pictorial view of a battery incorporating the means of this invention.

In the figures like numbers refer to like objects.

Referring now to FIGS. 1 through 5. Battery 1 is provided with gas intake and exit chamber 2 which is shown here as being transparent and of zero wall thickness for the sake of clarity of illustration. Chamber 2 is joined to battery top 3 which in turn is sealed to battery 1 to form a substantially unitary structure.

Chamber 2 is divided in air intake chamber 4 and gas exhaust chamber 5.

Air intake chamber 4 is provided with air intake tube 6 which has floating ball valve 7 positioned in cup 8 which is submerged in noncombustible antifreeze liquid 9.

When air is required by battery 1 pressure over liquid 9 of chamber 4 is reduced, ball valve 7 is opened, air enters vent 12, passes through ports 13 in cup 8, and bubbles up through liquid 9 until equilibrium is reestablished.

When gas pressure in the battery cells becomes elevated gas is discharged through exhaust tube 14, floating ball valve 15 is displaced and gas passes through ports 16 in cup 17 and bubbles up through liquid 9. Ball valve 18 is displaced and the gas is vented through exhaust vent 19.

By bubbling gases entering and leaving the battery through liquid 9 the possibility of ignition reaching the inside of the battery by way of propagation from an outside source is reduced to very nearly zero provided the battery is sealed against gas flow into and out of the battery by other routes.

Towards this end the inventor has provided his explosion proof battery with liquid inspection and maintenance means which preserve the sealed integrity of the battery during the inspection testing and when needed adding of fluid to the battery cells.

Figure 2:
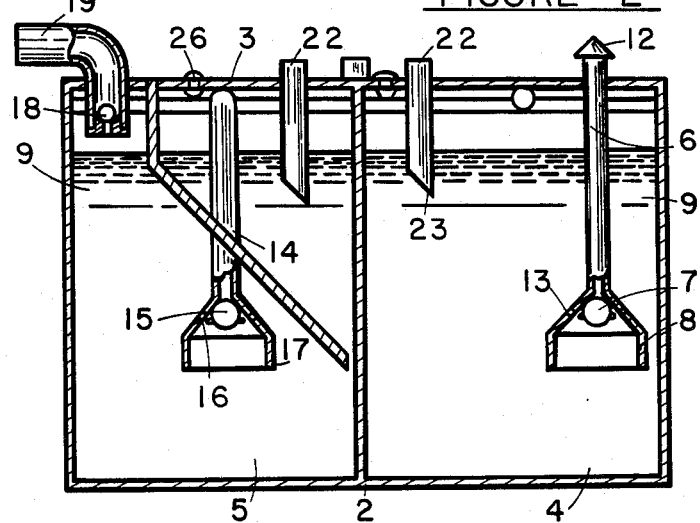
FIG. 2 is sectioned elevational schematic view of the gas input and output chamber of the means of FIG. 1.
Figure 3:
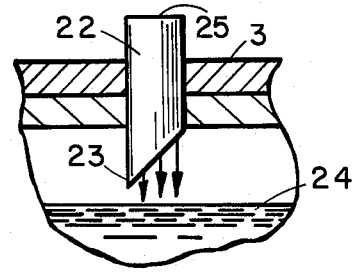
FIG. 3 is a fragmentary elevational sectional view illustrating the sight tube of this invention.
Figure 4:
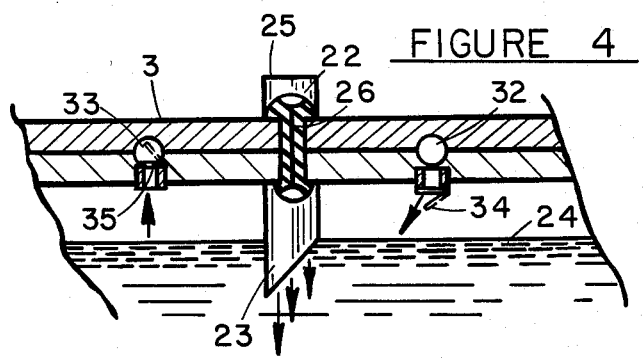
FIG. 4 is a fragmentary elevational sectional view illustrating the sight tube, fill valve, and gas intake and exhaust valves for one cell of a battery made according to this invention.

Sight rods 22 are plastic (lucite) rods with the ends polished and which function similar to a glass bottomed bucket. When the liquid end 23 of rod 22 is above battery fluid 24, as shown in FIG. 3 the image seen through the top 25 of tube 22 is of the top of the liquid which ordinarily shows white or shiny. When the liquid end 23 of rod 22 is below the liquid level as shown in FIGS. 2 and 4, the view is of the battery plates or the bottom of the cell which ordinarily shows dark or black. Each cell and chamber of the battery is provided with a rod 23.

Figure 5:
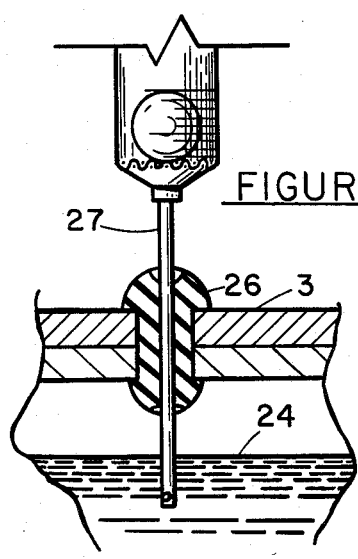
FIG. 5 is a fragmentary elevational sectional view illustrating the liquid fill and removal means of this invention.

Each cell and chamber of the battery of this invention is also provided with a resilient, self sealing, valve 26 which functions much like the valve in a football or basketball wherein a needle similar to needle 27 of FIG. 5 may be inserted and removed without destroying the gas seal of the valve. Needle 27 may be attached to a syringe which may serve to withdraw liquid for testing and to add liquid as needed.

As shown in FIGS. 1 and 4, each cell of battery 1 is provided with a gas entry port 32 and a gas exit port 33. The gas entry port is provided with a flapper valve 34 which will permit gas to enter the cell but not permit gas to exit the cell through valve 34. In a like manner gas exit port 33 is provided with flapper valve 35 which will permit gas to exit the cell but not permit gas to enter the cell through valve 35.

By isolating each cell of battery 1 from all the other cells of battery 1 by means of valve 34 and 35 the inventor has provided a means for barring the propagation of ignition from cell to cell in battery 1 should the ignition be generated internally of battery 1. Such ignition can be caused by faulty construction or faulty materials.

The inventor knows of no battery construction which heretofore served to prevent externally originating ignition from reaching the interior of the battery and to prevent internally generated ignition from propagating from cell to cell. This combination is certainly novel in a unitary construction such as battery 1.

In the foregoing disclosure the inventor has chosen to employ one way valves such as flapper valves, floating ball valves, and gravity ball valves. It can be readily appreciated that check valves that are the functional equivalent of the valves taught will serve the end sought.

However, when it is anticipated that the battery may be tipped at steep angles or even inverted in use, a somewhat more elaborate means of controlling liquid and gas movement is desirable.

Figure 6:
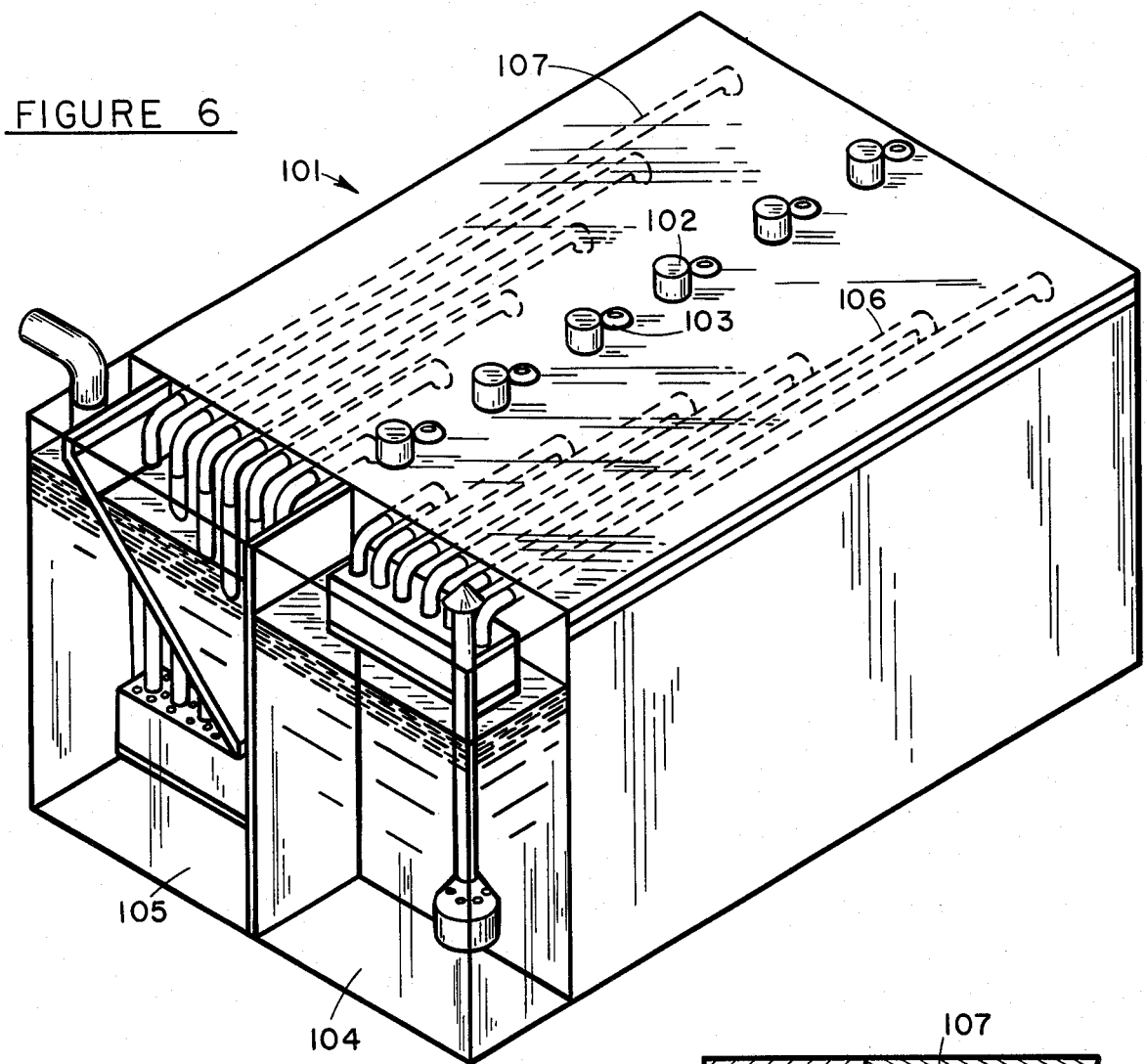
FIG. 6 is a schematic pictorial view of a second embodiment of this invention.
Figure 7:
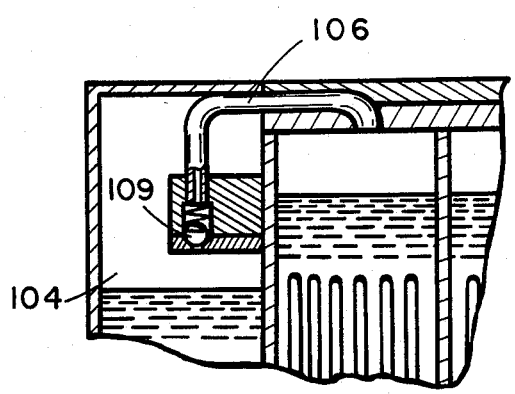
FIG. 7 is a fragmentary sectioned elevational view of the air intake means of the embodiment of FIG. 6.
Figure 8:
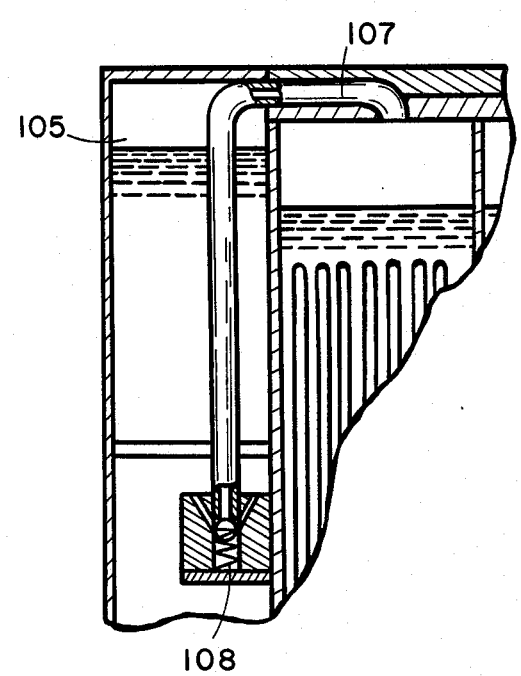
FIG. 8 is a fragmentary sectioned elevational view of the exhaust discharge means of the embodiment of FIG. 6.

Referring now to FIGS. 6, 7, and 8. Battery 101 is provided with sight rods 102, self sealing valves 103, intake chamber 104, and exhaust chamber 105 similar to those discussed in relation to battery 1. Each cell of battery 101 is provided with an intake conduit 106 and an exhaust conduit 107.

Each conduit 106 is provided with a spring loaded check valve 109 and each conduit 107 is provided with a spring loaded check valve 108.

The provision of spring loaded check valves 108 and 109 serve to provide a positive bias to the valving of battery 101 even when the battery is tilted on its side or inverted.

The inventor has disclosed herein the best modes for practicing this invention known to him at the time of filing this patent application.

It should be clearly understood, however, that the scope of this invention should not be limited to the scope of the disclosed embodiments but should only be limited by the scope of the appended claims and all equivalents thereto which would become apparent to one skilled in the art.

I claim:

1. A portable explosion proof battery comprising; in combination,
    (a) more than one cell, each cell having a top, a bottom and sides wherein,
    (b) the top is provided with a cover which has operably joined therewith a gas entry check valve which admits atmospheric air to the cell, a gas exit check valve, a continuously self sealing liquid input and removal passage, and a liquid level indicator sight rod, and
    (c) the gas entry check valve and the gas exit check valve are associated with fluid carrying paths, between the cell and a liquid filled combustion barrier chamber.

2. The battery of claim 1 wherein the fluid carrying paths are independent conduits which are a part of a single battery top header which sealably covers the tops of the cells of the battery.

3. The battery of claim 2 wherein the sight rods and input and removal passages for each cell are permanently assembled as a part of the header.

4. The battery of claim 3 wherein the battery, the header, and the combustion barrier chamber are fabricated so as to form a single unit.

* * * * *